(Model.)

J. C. DUCKWORTH.
BOLT HEADING MACHINE.

No. 252,440. Patented Jan. 17, 1882.

(Model.)

J. C. DUCKWORTH.
BOLT HEADING MACHINE.

No. 252,440.    Patented Jan. 17, 1882.

6 Sheets—Sheet 3.

Witnesses,
Inventor,
John C. Duckworth

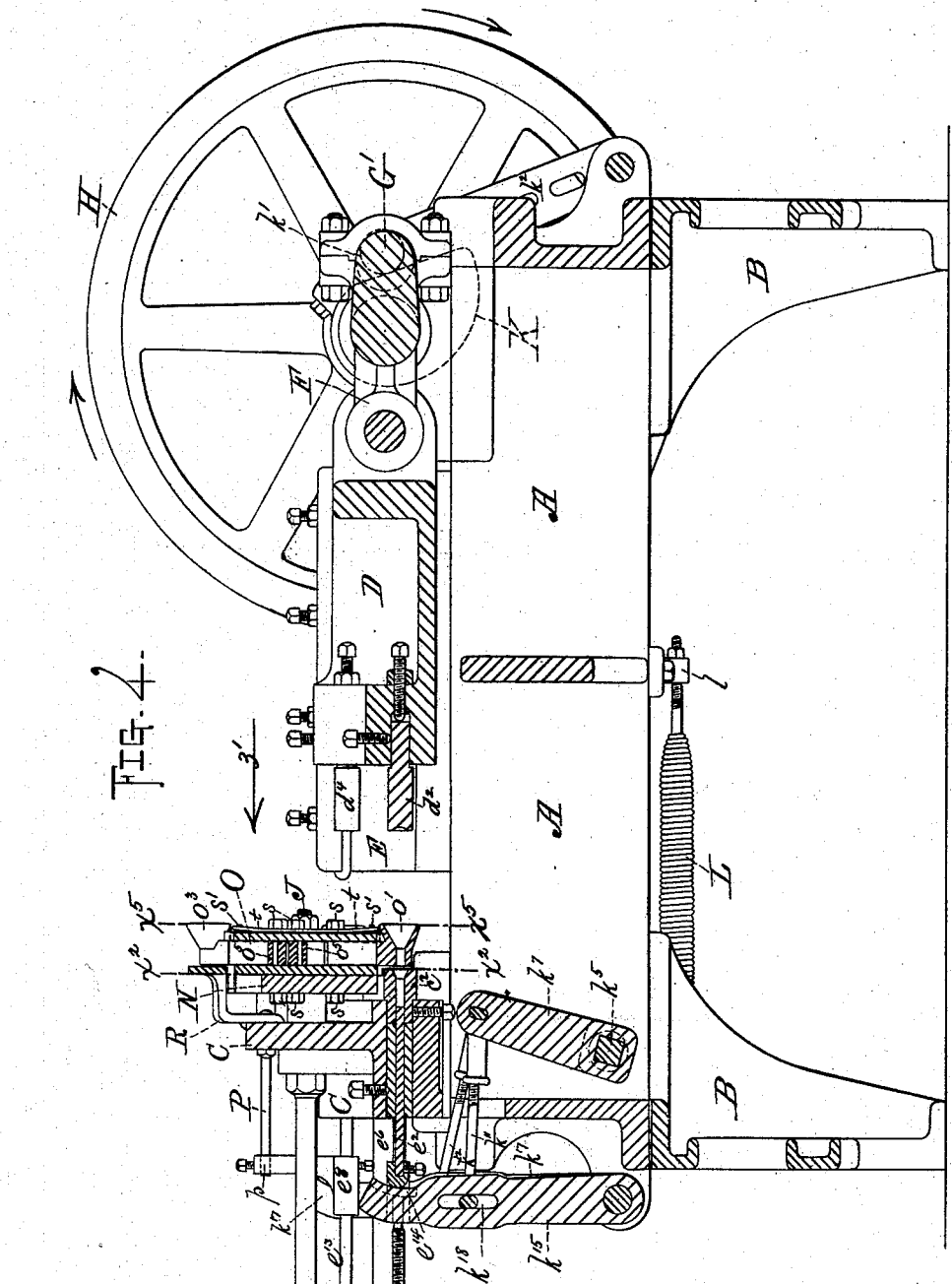

(Model.)

J. C. DUCKWORTH.
BOLT HEADING MACHINE.

No. 252,440.

6 Sheets—Sheet 5.

Patented Jan. 17, 1882.

Witnesses,
Thos. B. Dodge
Edwin C. Moore

Inventor,
John C. Duckworth (Model.)
J. C. DUCKWORTH.
BOLT HEADING MACHINE.
No. 252,440. Patented Jan. 17, 1882.
6 Sheets—Sheet 6.
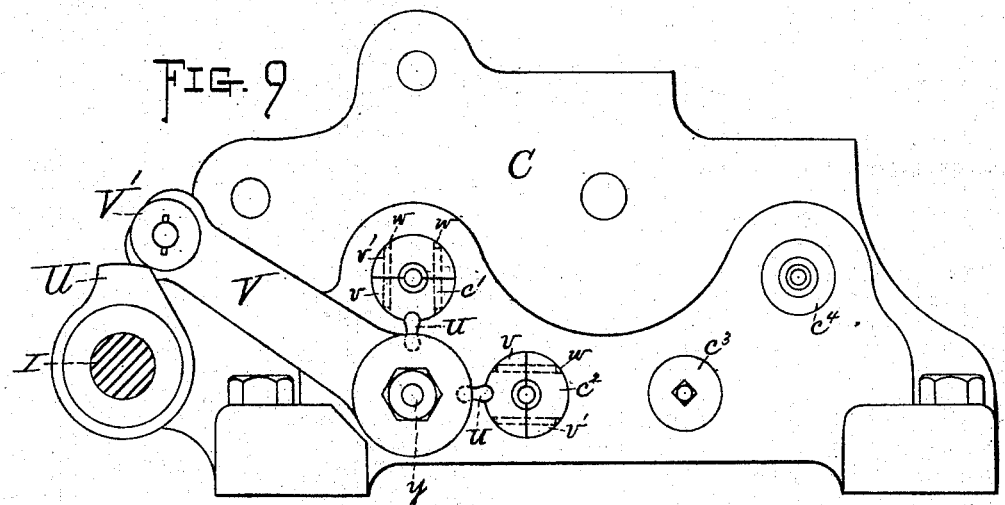
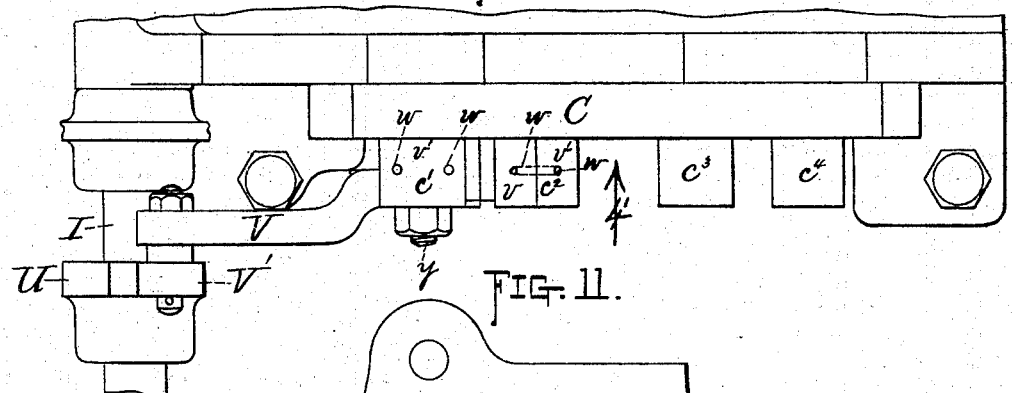
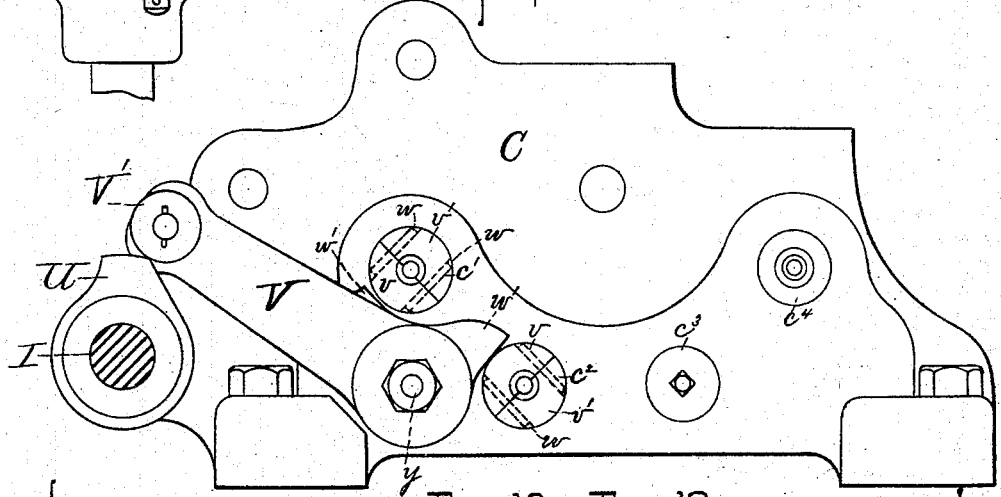
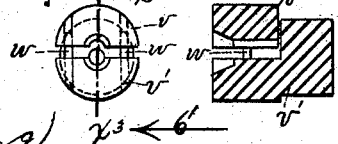

UNITED STATES PATENT OFFICE.

JOHN C. DUCKWORTH, OF WORCESTER, MASSACHUSETTS.

BOLT-HEADING MACHINE.

SPECIFICATION forming part of Letters Patent No. 252,440, dated January 17, 1882.

Application filed March 14, 1881. (Model.)

*To all whom it may concern:*

Be it known that I, JOHN C. DUCKWORTH, of the city and county of Worcester, and Commonwealth of Massachusetts, have invented certain new and useful Improvements in Bolt-Heading Machines; and I do hereby declare that the following is a full, clear, and exact description of the same, reference being had to the accompanying drawings, forming a part of this specification, and in which—

Figure 1:
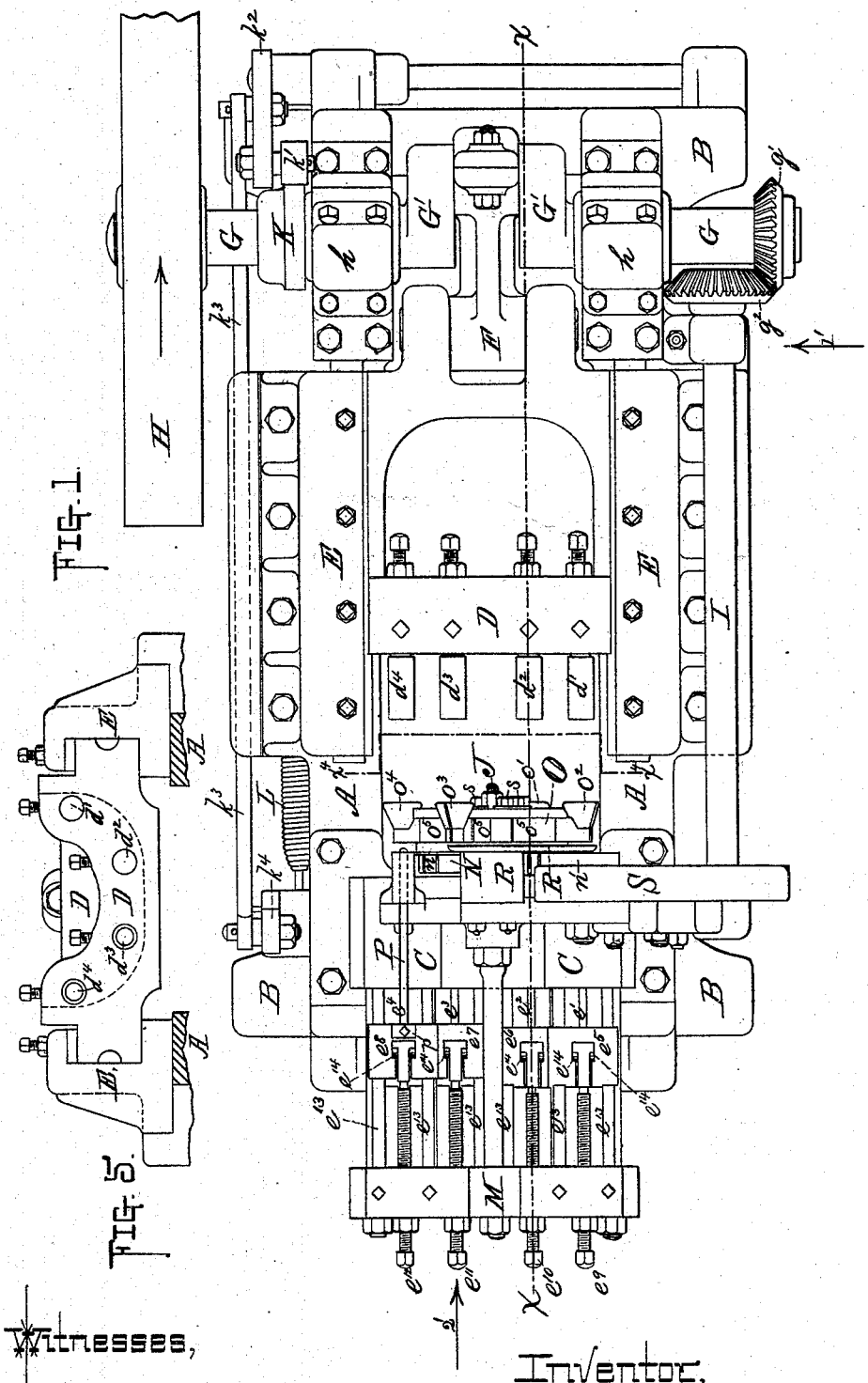
Figure 2:
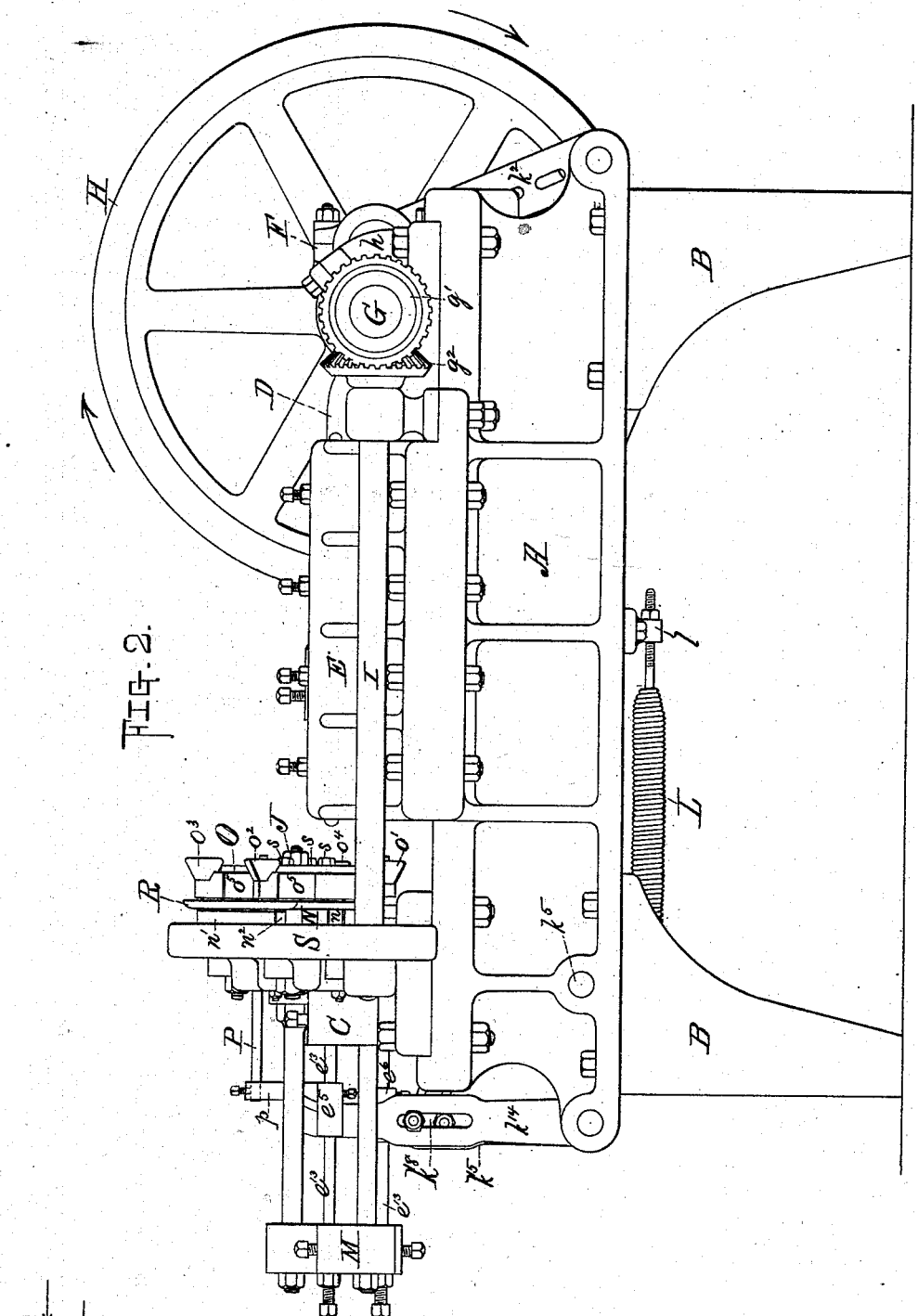
Figure 3:
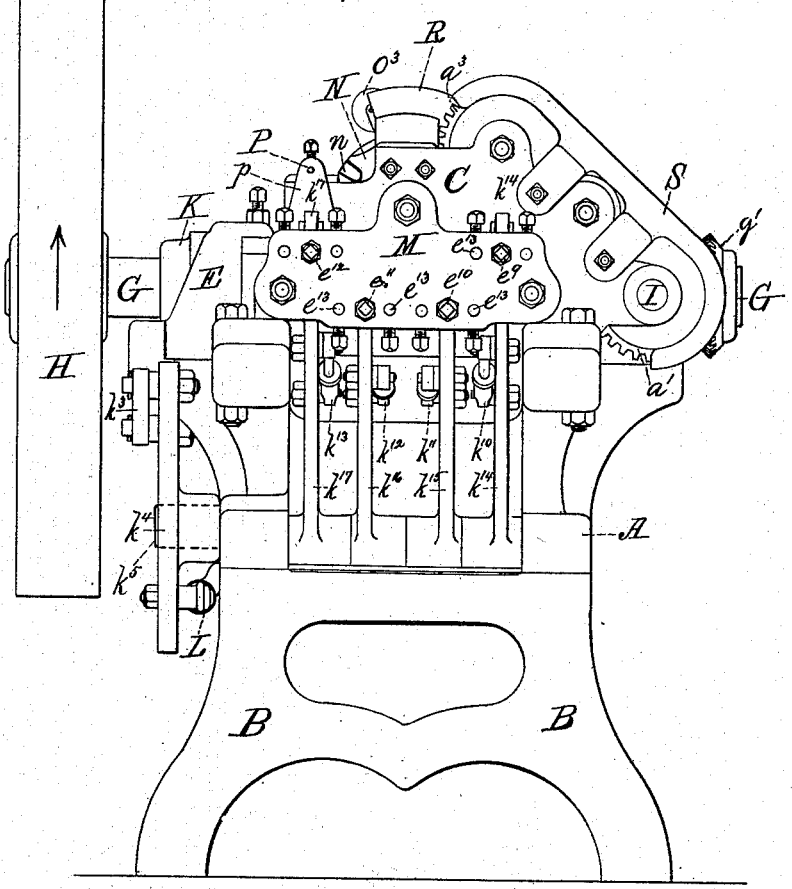
Figure 6:
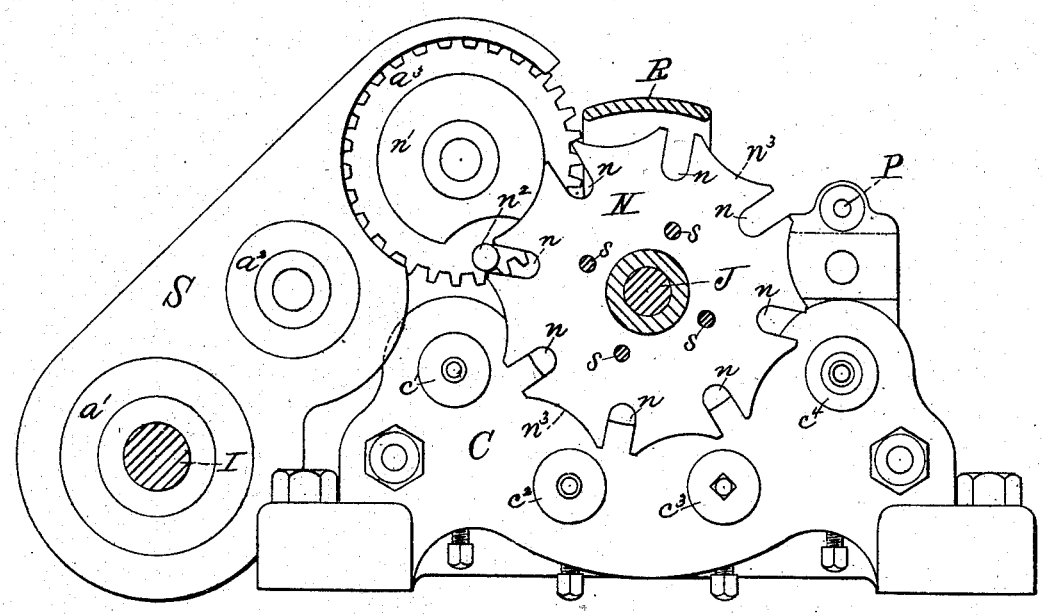
Figure 7:
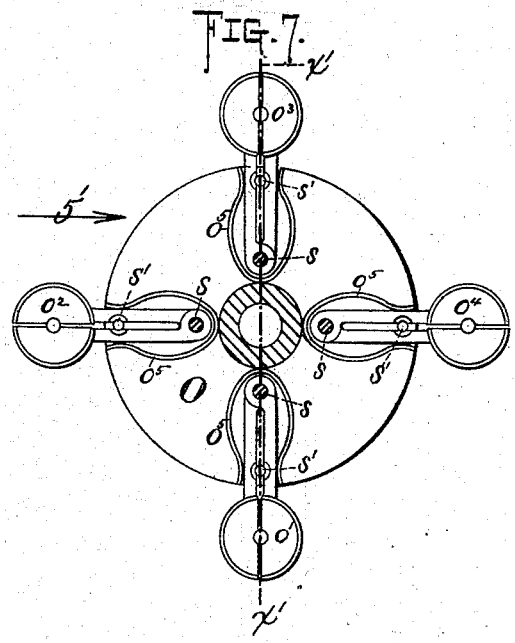
Figure 8:
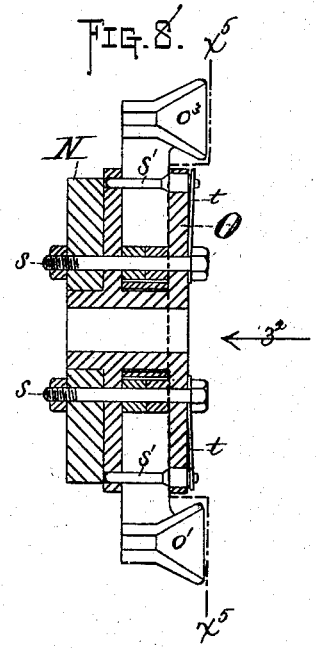

Figure 1 represents a top or plan view of a bolt-heading machine with my improvements applied thereto, as will be hereinafter more fully described. Fig. 2 represents a side view of the machine shown in Fig. 1, looking in the direction indicated by arrow $1'$, same figure. Fig. 3 represents an end view of the machine, looking in the direction indicated by arrow $2'$, Fig. 1. Fig. 4 represents a vertical longitudinal section through the machine, taken on line $x\ x$, Fig. 1, looking in the direction indicated by arrow $1'$, same figure. Fig. 5 represents a vertical transverse section through a part of the machine, taken on line $x^4\ x^4$, Fig. 1, looking in the direction indicated by arrow $2'$, same figure. Fig. 6 also represents, upon an enlarged scale, a vertical transverse section through another part of the machine, taken at the point shown by lines $x^2\ x^2$, Fig. 4, looking in the direction indicated by arrow $3'$ of said Fig. 4. Fig. 7 also represents, upon the same enlarged scale, a section through another part of the machine, taken at the point indicated by lines $x^5\ x^5$, Figs. 4 and 8, looking in the direction of arrow $3'$, Fig. 4, and $3^2$, Fig. 8. Fig. 8 represents a central vertical section through the parts shown in Fig. 7, taken on line $x'\ x'$, and looking in the direction indicated by arrow $5'$, same figure. Figs. 9, 10, 11, 12, and 13 represent, upon the same enlarged scale as Figs. 6, 7, and 8, modifications of parts of the machine, which will be hereinafter more fully described. The last one, Fig. 13, represents a vertical central section through the parts shown in Fig. 12, taken on line $x^3\ x^3$, and looking in the direction indicated by arrow $6'$ of said figure.

To enable those skilled in the art to which my invention belongs to make and use the same, I will proceed to describe it more in detail.

The nature of my invention consists in the combination and arrangement of dies and heading-punches (one punch for each die) and plunger mechanism, the said dies being stationary and the heading-punches secured in a moving or reciprocating head; also, in the novel arrangement of tongs or clamps for holding and feeding the bolt-blanks from die to die while the machine is in operation; also, in the combination, with the bolt-blank tongs or clamps, of the mechanism for giving to them an intermittent revolving motion; also, in the combination, with the heading-punches, of the cup or conical mouth-shaped tongs or clamps for holding the blanks; also, in the plunger mechanism, consisting of the plungers and slides, levers, and regulating-screws, as hereinafter set forth; also, in the discharging mechanism for discharging the finished blank bolts from the tongs or clamps; also, in the arrangement of levers and connections with plunger-levers, so that each plunger can be regulated or adjusted separately when all are operated from one cam.

In the drawings, A represents the main frame resting on the legs B B.

C is the die-head; D, the slide-head upon which the punches are arranged; E E, slide-ways; F, the pitman connecting the slide D with the crank $G'$ on main shaft $G$; H, the driving-wheel, revolving in the direction indicated by arrows; and $h\ h$, the bearing-boxes of main shaft $G$.

On main shaft $G$ is secured the bevel-gear wheel $g'$, which meshes into bevel-gear wheel $g^2$, and thus communicates motion to the spur-gear wheels $a'\ a^2\ a^3$ through the medium of shaft I. (See Figs. 3 and 6.)

S is a support for spur-gear wheels $a'\ a^2\ a^3$, which is bolted to head C.

$c'\ c^2\ c^3\ c^4$ are the stationary dies, arranged in the arc of a circle from the center of stud J in the die-head C. (See Fig. 6.)

$d'\ d^2\ d^3\ d^4$ are the heading-punches, secured in the slide-head D in the arc of a circle to correspond to the dies $c'\ c^2\ c^3\ c^4$, each punch opposite its respective die.

It will be readily understood by those versed in the art that the form or shape of the dies and heading-punches may be varied according to the shape of the bolt-head required to be made. In illustrating the advantages of this arrangement I have only shown four dies and four heading-punches, which may be so made as to form a bolt with an oval, round, or button head, as desired, and also a square shank under the head, if preferred.

By the first die, $c'$, and heading-punch $d'$ the blank will be partially upset. The second die, $c^2$, and heading-punch $d^2$ will upset the blank still more, and thus compress and upset the metal into proper shape to form the head and shank, which may be finished in the third die, $c^3$. In the last operation there is a fin left around the edge of the bolt-head. By the fourth die, $c^4$, and punch $d^4$ this fin is removed and the blank bolt finished, and it is afterward discharged from the machine, as hereinafter explained.

On main shaft G is a cam, K, for operating the plungers $e'$ $e^2$ $e^3$ $e^4$ in the die-head C through stud-roll $k'$, lever $k^2$, connecting-rod $k^3$, and arm $k^4$, vibrating shaft $k^5$, which latter has bearings at each end in main frame A.

On the shaft $k^5$ are secured arms $k^7$, one of which is shown in Fig. 4. The others, being back of the plunger-levers, are not shown, and to the upper ends of said arms are hinged or pivoted connecting-rods $k^{10}$ $k^{11}$ $k^{12}$ $k^{13}$, which in turn are secured to plunger-levers $k^{14}$ $k^{15}$ $k^{16}$ $k^{17}$, and the said plunger-levers are arranged to bear against the plunger-slides $e^5$ $e^6$ $e^7$ $e^8$, in which the plungers $e'$ $e^2$ $e^3$ $e^4$ are secured. Plunger-slides move back and forth on their rods $e^{13}$.

Spiral spring L, which is secured at one end to bracket $l$ on main frame A, and attached to the lower end of arm $k^4$, forces stud-roll $k'$ to follow the surface of cam K through connecting-rod $k^3$ and lever $k^2$, and also forces the plunger-levers $k^{14}$ $k^{15}$ $k^{16}$ $k^{17}$ back against the ends of regulating-screws $e^9$ $e^{10}$ $e^{11}$ $e^{12}$ in plate M through arms $k^7$ (one of which is shown in Fig. 4) and connecting-rods $k^{10}$ $k^{11}$ $k^{12}$ $k^{13}$, and also forces back the plungers $e'$ $e^2$ $e^3$ $e^4$ by means of a projection, $e^{14}$, on each side of the plunger-levers $k^{14}$ $k^{15}$ $k^{16}$ $k^{17}$, which projections work in recesses of plunger-slides $e^5$ $e^6$ $e^7$ $e^8$, as fully indicated in Figs. 1 and 4. The screws $e^9$ $e^{10}$ $e^{11}$ $e^{12}$ are for the purpose of resisting the blow of the heading-punches when striking or acting upon the bolt-blanks, and they are also employed to gage the various lengths of bolts to be made.

The plunger-levers $k^{14}$ $k^{15}$ $k^{16}$ $k^{17}$ have slots $k^{18}$, in which the studs of connecting-rods $k^{10}$ $k^{11}$ $k^{12}$ $k^{13}$ are secured. By changing the position of said studs in their respective slots the throw of each of said plunger-levers may be varied to regulate the throw of plungers $e'$ $e^2$ $e^3$ $e^4$. By this arrangement of separate plunger-levers and connections each plunger may be regulated to stop the blank at different positions in the dies, whereby the heading operation may be varied in the different dies—that is, one heading-die may be made to upset or head the blank more than another. The plungers have sufficient throw or motion to force the blank entirely out of the dies, so that blanks will not catch as they are moved from one die to the other.

To regulate the plungers for different lengths of bolts, the regulating-screws $e^9$ $e^{10}$ $e^{11}$ $e^{12}$ are set for such length as is required, and varying throw or movement of the plungers is obtained by moving the studs of connecting-rod $k^3$ in either or both the lever $k^2$ or arm $k^4$.

In Fig. 6 an enlarged view of die-head C is represented, and J is a stud secured to or projecting therefrom. N is a plate or sprocket-wheel revolving on stud J, and having slots $n$ and concave circles $n^3$ corresponding to the circle of disk-plate $n'$. Said disk-plate $n'$ is secured to spur-gear wheel $a^3$. A portion of the periphery of said disk-plate is cut away, and a pin, $n^2$, is secured in spur-gear wheel $a^3$, so that at each revolution of said gear-wheel $a^3$ the pin $n^2$ takes into one of the slots $n$ formed in plate-wheel N, and turns it one-eighth of a revolution, and then securely locks it by means of disk-plate $n'$, fitting into one of the concave circles $n^3$ of said sprocket-wheel N.

To plate or sprocket wheel N is secured the wheel O, and consequently has the same intermittent revolving motion as wheel N. In the wheel O are arranged and secured the tongs or clamps $o'$ $o^2$ $o^3$ $o^4$, as indicated in the drawings. In these clamps the properly-heated blanks for making the bolts are inserted above the axis of its motion, and said blanks thereafter are carried around opposite the center of each die $c'$ $c^2$ $c^3$ $c^4$ in the operation of the machine. These clamps have a cup or conical mouth to enable a blank to be readily inserted, and also to enable them to be easily opened by the punches $d'$ $d^2$ $d^3$ $d^4$ as they are moved forward to push the blanks into the dies $c'$ $c^2$ $c^3$ $c^4$, and said punches keep the said clamps open until the said punches recede, and the bolt-blanks are forced out by the plungers $e'$ $e^2$ $e^3$ $e^4$ immediately as the said punches recede from the said dies.

The cam K on shaft G must be of the proper shape and set in time to force the bolt-blanks out of the dies and follow closely the punches as it recedes, so that the blanks will enter the tongs or clamps before the punches have left them, and said clamps are brought together by the springs $o^5$ and clamp their respective bolt-blanks as the said punches leave the said clamps. When the heading-punches have receded sufficiently wheel O and its clamps move the bolt-blanks from die to die, the motion of wheel O being obtained, as indicated above, by means of the action of pin $n^2$ on sprocket-wheel N. The machine being in continuous motion, the blanks can be inserted in the said clamps at any time between the discharge and the first die $c'$.

In Figs. 7 and 8, $o'$ $o^2$ $o^3$ $o^4$ represent the tongs or clamps, which are pivoted on the bolts $s$ $s$ $s$ $s$, and open each way from the central steady pins, $s'$ $s'$ $s'$ $s'$.

$o^5$ are springs of sufficient strength to force the clamps $o'$ $o^2$ $o^3$ $o^4$ together and hold the bolt-blank firmly. The clamps $o'$ $o^2$ $o^3$ $o^4$ are prevented from binding on the stop or steady pins in consequence of said pins being small enough to allow the said clamps to bind on the bolt-blanks before clamping said pins. To hold the clamps steady and in proper position for the dies $c'$ $c^2$ $c^3$ $c^4$, the said pins $s'$ are formed with bevel-heads, and are forced in against said clamps by flat springs $t$ $t$ $t$ $t$, as indicated in Fig. 8.

A stop-plate, R, is arranged and secured on die-head C, which prevents the bolt-blanks being pushed in too far in the clamps $o'$ $o^2$ $o^3$ $o^4$ when first inserted.

The part marked P represents the discharger for discharging the blanks-bolts from the clamps after they have passed the finishing-die $c^4$, and the rear end of said discharger P is secured to an upwardly-projecting stand-piece, $p$, from the slide $e^8$, and consequently each time the slide $e^8$ is moved forward discharger P will be forced entirely through one of the clamps and the bolt-blank forced out and delivered from the machine.

The forming-dies, at least two of them, may be made under some circumstances in a modified form, substantially as shown in the drawings, Figs. 9 and 13, inclusive.

Figs. 12 and 13 represent one half of the dies $c'$ and $c^2$ movable—that is, so made that one half can move away from the other or stationary part of the die.

The parts marked $v$ are movable, and the parts marked $v'$ are stationary, being secured and rigidly fastened to the die-head C.

The movable parts $v$ of the dies $c'$ and $c^2$ are arranged to slide back and forth on pins $w$ $w$ in such a manner that the movable part is always retained in its proper relative position, as respects the other parts of the machine, during the opening and closing of the dies.

On the fulcrumed stud $y$ a lever, V, is arranged with a friction-roll, V', upon its upper end. Said friction-roll rests upon the face of cam U, fast on the shaft I, and is consequently elevated and allowed to fall at each revolution of the cam U.

In Fig. 9 short toggle-pieces with rounded ends are fitted in corresponding rounded depressions or recesses in the hub of lever V and in the movable parts $v$ $v$ of the dies, while in Fig. 11 projections $w'$ $w'$ are formed on the lever V to bear against the movable parts $v$ $v$ of the dies $c'$ and $c^2$, to close and hold the dies together once in each revolution of shaft I and cam U, as and for the purpose hereinafter explained.

From the foregoing description it will be seen that when cam U acts with its greatest throw upon the upper end of lever V in both cases the movable parts of the dies will be forced up toward and closed against the stationary parts of the dies, and that when the cam U ceases to act upon lever V the movable parts of the dies will be loosened and allowed to spread apart.

The object of using the divided dies is to obviate any wedging of the shank part of the bolt-blanks in the dies, when long bolts are made so as to retard or interfere with the proper discharge of the bolt-blanks from the dies, by their respective plungers.

Having described my improvements in bolt-heading machines, what I claim therein as new and of my invention, and desire to secure by Letters Patent, is—

1. In a bolt-heading machine, the combination of stationary dies, heading-punches, regulating-screws, and automatically-moving clamps or tongs, when combined and operating substantially as described.

2. One or more bolt-blank tongs or clamps, $o'$, provided with a spring, $o^5$, and steadying-pin $s'$, substantially as and for the purposes described.

3. The combination of the tongs or clamps with the sprocket-wheel N, disk-plate $n'$, pin $n^2$, and toothed wheel $a^3$, substantially as and for the purpose described.

4. The combination, with a bolt-heading punch, of the cup or conical shaped mouthed tongs or clamps $o'$, substantially as described.

5. The combination, with plunger $c'$, plunger-slide $e^5$, plunger-lever $k^{14}$, and operating-connections, of regulating-screw $e^9$, substantially as and for the purposes set forth.

6. The combination, with rotating sprocket-wheel N, wheel O, and clamp $o'$, of discharger P, substantially as described.

7. The combination, with a series of plunger-levers, $k^{14}$ $k^{15}$ $k^{16}$ $k^{17}$, provided with slots $k^{18}$, of a series of slides, $e^5$, $e^6$, $e^7$, and $e^8$, and a series of operating-arms, $k^7$, substantially as and for the purposes set forth.

JOHN C. DUCKWORTH.

Witnesses:
THOS. H. DODGE,
EDWIN E. MOORE.